United States Patent [19]

Le Bars et al.

[11] Patent Number: 5,118,943

[45] Date of Patent: Jun. 2, 1992

[54] DEVICE FOR CORRECTING THE FAULTS OF A SEQUENCE OF IMAGES ANALYZED BY AN INTEGRATING MATRIX INFRARED SENSOR

[75] Inventors: Jean-Francois Le Bars; Jean-Marie Deler, both of Paris; Laurent Baron, Bougival, all of France

[73] Assignee: Thomson-CSF, Puteaux, France

[21] Appl. No.: 585,941

[22] Filed: Sep. 21, 1990

[30] Foreign Application Priority Data

Sep. 22, 1989 [FR] France ................................ 89 12484

[51] Int. Cl.⁵ ............................................... H04N 5/33
[52] U.S. Cl. .................................. 250/332; 250/252.1;
358/113; 358/213.16
[58] Field of Search ........ 250/332, 330, 334, 252.1 A;
358/113, 213.17, 213.16

[56] References Cited

U.S. PATENT DOCUMENTS

| | | | |
|---|---|---|---|
| 3,895,182 | 7/1975 | Trilling | 358/113 |
| 4,423,437 | 12/1983 | Beck et al. | 358/113 |
| 4,560,286 | 12/1985 | Wickersheim | 374/131 |
| 4,605,851 | 8/1986 | Ometz et al. | 250/223 B |
| 4,628,352 | 12/1986 | Boue | 358/213.17 |
| 4,703,442 | 10/1987 | Levine | 358/213.17 |

FOREIGN PATENT DOCUMENTS

| | | | |
|---|---|---|---|
| 176389 | 4/1986 | European Pat. Off. | 358/213.17 |
| 2828119 | 1/1979 | Fed. Rep. of Germany | 250/336.1 |

OTHER PUBLICATIONS

Patent Abstracts of Japan, vol. 13, No. 316 (P-900)(3664) Jul. 18, 1989; & JP-A-10 881216 (Fujitsu) Apr. 3, 1989.
Patent Abstracts of Japan, vol. 6, No. 229 (P-155) Nov. 16, 1982; & JP-A-57 132 031 (Fujitsu) Aug. 16, 1982.
Patent Abstracts of Japan, vol. 10, No. 152 (P-462) Jun. 3, 1986; & JP-A-61 004 932 (Nippon Avionics K.K.) Jan. 10, 1986.

Primary Examiner—Carolyn E. Fields
Assistant Examiner—Drew A. Dunn
Attorney, Agent, or Firm—Oblon, Spivak, McClelland, Maier & Neustadt

[57] ABSTRACT

A device for correcting the faults of a sequence of images analyzed by an integrating matrix infrared sensor has a first part that determines a correction signal that is variable as a function of the temperature of the background of the images, equal to the product of a value representing the mean luminance of an image preceding the image undergoing correction, and a signal representing approximately the sensitivity of each cell of the sensor, constituted by the values of a video signal corresponding to an image analyzed in the course of a pre-calibration period; and a second part to determine a second correction signal, in storing the values of the first corrected video signal during a calibration period. An application of this device could be for the infrared cameras used in weapons systems.

6 Claims, 3 Drawing Sheets

PRIOR ART FIG. 1

DEVICE FOR CORRECTING THE FAULTS OF A SEQUENCE OF IMAGES ANALYZED BY AN INTEGRATING MATRIX INFRARED SENSOR

BACKGROUND OF THE INVENTION

1. Field of the Invention

The invention concerns a device for correcting the faults of a sequence of images analyzed by an integrating matrix infrared sensor, said sensor being formed by a matrix of photosensitive cells giving a video signal that successively expresses the integrated luminance of each pixel of an image.

Standard infrared cameras include an individual detector or a linear array of detectors analyzing an image by means of an optomechanical scanning operation. They give a video signal expressing the instantaneous luminance of each pixel. There now exist matrix sensors that do not call for any optomechanical scanning to analyze an image. The successive analysis of the pixels is done inside the sensor, by charge-coupled or charge-transfer or other types of electronic devices. In any case, the sensor includes: zones for storing the charges generated by the photons, between two readings, an addressing device enabling access selectively to the storage zones and a charge-transfer device enabling the removal of the charges towards an output and the obtaining of a video signal successively expressing the quantity of the charges stored in each of the storage zones.

The quantity of charges stored in a storage zone is a function of the luminance of the pixel corresponding to this zone and is proportionate to the time between two readings. The corresponding vide signal therefore represents the integrated luminance. When an image has a background having a certain degree of luminance, the video signal includes a continuous component that is a function of the luminance of the image background. This luminance is itself a function of the temperature of the background, since the images are infra-red ones. This continuous component has a very high relative value with respect to the variable component representing a scene. In the spectral bands extending from 3 to 5 micrometers and from 8 to 12 micrometers for example, a temperature difference equal to one degree, between the scene and the background, is expressed typically by a variation of 1% between the video signal and the continuous component.

To exploit the video signal, it is necessary to eliminate the continuous component in order to amplify only the variable component corresponding to the details of the scene. Unfortunately, it is not possible to subtract simply a constant value from the video signal, firstly because each cell of the sensor gives a slightly different response from that of the other cells, and secondly because this response varies as a function of the luminance of the image background, that is, it varies as a function of the temperature of this image background, and secondarily as a function of the temperature of the structures surrounding the sensor.

During the analysis of an image representing a uniform background, the cells of one and the same sensor give slightly different responses which constitute a video signal comprising a fixed noise superimposed on a continuous component equal to the mean response of the cells. The values of sensitivity of the cells of one and the same sensor are distributed, roughly, according to a Gaussian relationship having a standard deviation equal to a few percent. When there is no correction, a sequence of images representing a uniform background is restored by images having constant faults of uniformity. These faults of uniformity are troublesome not only for the observation of the restored images but also for an operation such as a target detection or a target tracking operation. To correct the restored images. it is necessary to correct the video signal in such a way that it has a constant level for a uniform background, and that this level is maintained when the temperature of the image background changes.

2. Description of the Prior Art

A first known method for correcting such images consists simply in memorizing the values of the video signal of an image having a uniform background, during a period of calibration, then in subtracting the values of the video signal of this image respectively from the values of the video signal of the current images. For the calibration, an image representing a uniform background is obtained by placing a shutter before the objective of the camera, or else by defocusing the images of the current scene.

This first correction method makes it possible to cancel precisely the video signal corresponding to the uniform background, for the temperature which was that of the background at the instant of the calibration. When the temperature of the background changes, the cancellation is no longer done. Not only does a response in variation appear for each cell but, in addition, this variation is not identical despite the uniformity of the background, since the sensitivity of the cells is not uniform.

A second known method consists in making, in addition to this fixed correction, a correction that is variable as a function of the temperature of the background and a correction that is variable as a function of the temperature of the structures surrounding the sensor. Indeed, the sensor sees not only the image to be analyzed but also infra-red rays emitted by the structures surrounding it. The second method consists, therefore, in making a measurement in the laboratory, once and for all, of the sensitivity of each cell with respect to the temperature of the background and the sensitivity of each cell with respect to the temperature of the structures, and in storing these values of sensitivity in two memories. These values of sensitivity are exact for a given temperature, and are only approximate in the neighborhood of this temperature. To correct a sequence of images, the method then consists in: measuring the temperature of the background of the images and the temperature of the structures, computing two correction signals, for each pixel, as a function of these measurements of temperature and as a function of the values of sensitivity stored in memory, then in subtracting these two variable correction signals from the video signal that has already undergone the subtraction of a fixed correction signal determined according to the first known method.

This second known method has the drawback of being complicated to implement since it makes it necessary to measure the temperature of the background and the temperature of the structure, and calls for high precision because the computation error on all the correction signals should remain far below the values of the signal representing the scene which, it may be recalled, are of the order of 1% of the value of the continuous component of the video signal before correction. Moreover, it is not possible to modify the values of sensitivity stored in memory, for they must be measured in the laboratory to make it possible to cause variation in both the temperatures. When the background temperature varies greatly, the stored values no longer enable a sufficiently precise correction to be made. Faults appear in the restored images.

SUMMARY OF THE INVENTION

It is an aim of the invention to propose a correction device that is simpler to make than the devices that implement this second known method while, at the same time, obtaining comparable performance characteristics when the background temperature changes, and enabling the calibration of the values of sensitivity to be redone when the background temperature has greatly changed. An object of the invention is a device comprising essentially two stages: a first stage for performing a correction that is variable as a function of the background temperature and an estimation of sensitivity of the cells, and a second stage for making a fixed correction. The second makes it possible to obtain an exact cancellation of the video signal, for each pixel, for a given temperature. The first stage makes it possible to obtain a correction that is variable as a function of the temperature, with a sufficient approximation, while being simpler than is the case in known devices. Furthermore, it makes it easy to obtain a calibration when the temperature of the background image has greatly changed.

According to the invention, there is proposed a device to correct the faults of a sequence of images analyzed by an integrating matrix infra-red sensor, the cells constituting this sensor having differences of sensitivity comprising: first correction means to determine and to subtract a first correction signal from the video signal given by the sensor, said first correction signal being variable as a function of the temperature of the background of the images, and second correction means to determine and subtract a second correction signal from the video signal;
wherein the second means are placed downstream of the first means, to determine the second correction signal as a function of a first corrected video signal given by the first means, and comprising means to store values of the first corrected video signal, in the course of a calibration period, during which the analyzed images represent a uniform background; the stored values being re-read periodically to constitute the second correction signal.

BRIEF DESCRIPTION OF THE DRAWINGS

The invention will be understood more clearly and other details will appear from the following description and from the accompanying figures.

DESCRIPTION OF A PREFERRED EMBODIMENT

Figure 1:
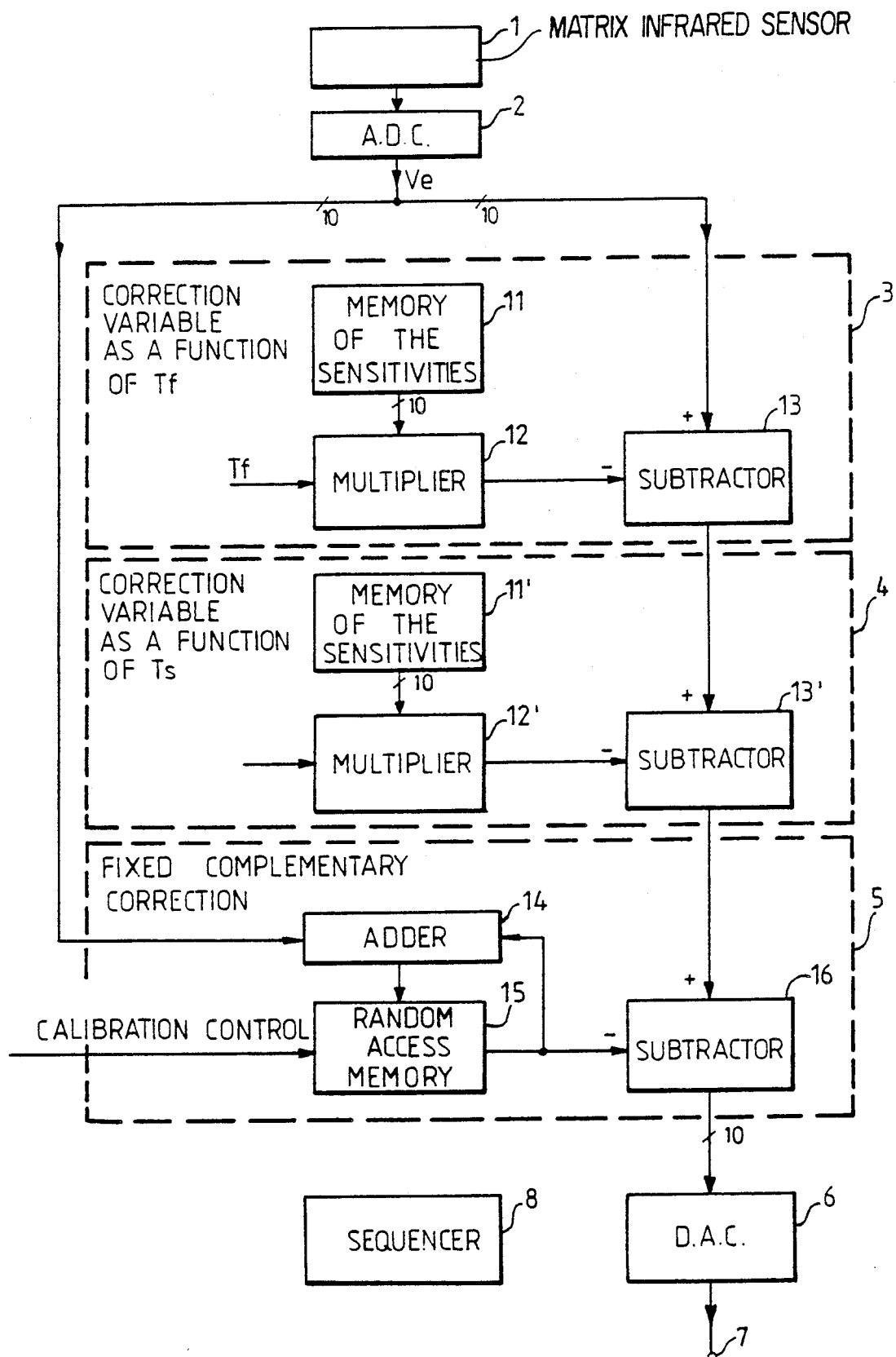
FIG. 1 shows a block diagram of an exemplary embodiment of a device implementing the second known method described above.

FIG. 1 shows a block diagram of an exemplary embodiment of a correction device according to the prior art, comprising essentially: means 3 to determine a first correction signal that is variable as a function Tf of the background of the images; means 4 to determine a second correction signal that is variable as a function of the temperature Ts of the structures neighboring the sensor, and means 5 to determine a fixed, complementary correction signal that is constant for a given pixel.

A matrix infra-red sensor (M.I.S.) 1 gives an analog video signal to an analog/digital converter (A.D.C.) 2, which converts this this video signal into a sequence of digital values encoded on 10 bits. These digital values are applied, firstly, to an input of the means 5 and, secondly, to an input of the means 3. Each of the means 3, 4, 5 has a subtractor: 13, 13', 16. These subtractors are series-connected to successively subtract the three correction signals from the video signal. These subtractors may be arranged in any order. The output of the subtractor 16 forms the output of the means 5 and gives the values of a corrected video signal to an input of a digital/analog converter (D.A.C.) 6. This converter 6 restores the corrected video signal, in analog form, to an output terminal 7 of the correction device.

In the neighborhood of a given background temperature Tf and in the neighborhood of a given structure temperature Ts, the value of the video signal given by a cell having coordinates i,j in the matrix forming the sensor may be represented by the following equation, except for one constant:

$$Ve = Gijs \cdot \Omega_s \cdot Ls(Ts) + Gijf \cdot \Omega_f Lf(Tf) \qquad (1)$$

where Gijs is a coefficient representing the sensitivity of the cell with respect to the luminance Ls(Ts) of the structures surrounding the sensor, these structures being seen by this cell at a solid angle $\Omega_s$; and where Gijf is a coefficient representing the sensitivity of the cell with respect to the luminance Lf(Tf) of the image background, which is seen by this cell at a solid angle $\Omega f$. The luminance of the background is related to its temperature by a known relationship. In the same way, the luminance of the structures is related to their temperature by a known relationship. In the neighborhood of the given temperatures Ts and Tf, the value of the video signal may be represented even more simply by an equation having the following form, except for one constant:

$$Ve = a \cdot Ts + b \cdot Tf \qquad (2)$$

where a and b are coefficients that represent the sensitivity with respect to Ts and the sensitivity with respect to Tf of the cell considered. The values of a and b are different for each cell of the sensor.

The means 3 include: a memory 11 storing the values b of the sensitivities with respect to Tf, a multiplier 12 and a subtractor 13. An output of the memory 11 is connected to a first input of the multiplier 12. A second input of the multiplier 12 receives the value Tf of the temperature of the background, which is given by a measuring apparatus that is not shown. An output of the multiplier 12 is connected to an input of the subtractor 13. Another input of the subtractor 13 receives the value Ve of the video signal. The output of the subtractor 13 constitutes an output of the means 3, connected to means 4, to give it a corrected video signal by subtracting a correction signal with a value b·Tf.

The means 4 have a structure similar to that of the means 3, to subtract a second correction signal, with a value a·Ts. The value Ts of the temperature of the structures is given by a measuring instrument (not shown). A memory 11' stores the values b of the sensitivities of the cells with respect to the temperature Ts.

The coefficients a and b are stored in the memories 11 and 11', in the form of 10-bit binary words, during a calibration operation performed once and for all, in the laboratory, and are valid only in the neighborhood of a given temperature Ts and a given temperature Tf. The further these temperatures are from these given values, the less precise is the correction of the faults. It is not easy to re-calibrate the coefficients a and b easily.

The means 5 comprise: an adder 14, a random access memory 15 and a subtractor 16. The adder 14 and the random access memory 15 constitute a mean-computing/accumulator device that computes and stores, for each pixel, the mean value of the video signal given by the sensor 1 in the course of a calibration period during which the analyzed image represents a uniform background.

During the calibration period, an operator sends a calibration signal which has the effect of validating the memory 15 in reading and in writing modes to perform the computation of the mean value of the video signal for each pixel, on a number of images that may be equal to 8 for example.

Then, during the period of use, the random access memory is validated only in reading mode to successively give the mean value of the video signal of each pixel. This sequence of values constitutes the third correction signal. This third signal is subtracted from the video signal, already corrected by the means 3 and 4, using the subtractor 16.

A sequencer 8 gives the clock signals and the read and write control signals for all the elements of the device. The digital/analog converter 6 converts the values of the corrected video signal into analog form.

The digital values of the correction signals and of the video signal are encoded on 10 bits in order to maintain a computing precision that is sufficient not to add faults to the restored images.

Figure 2:
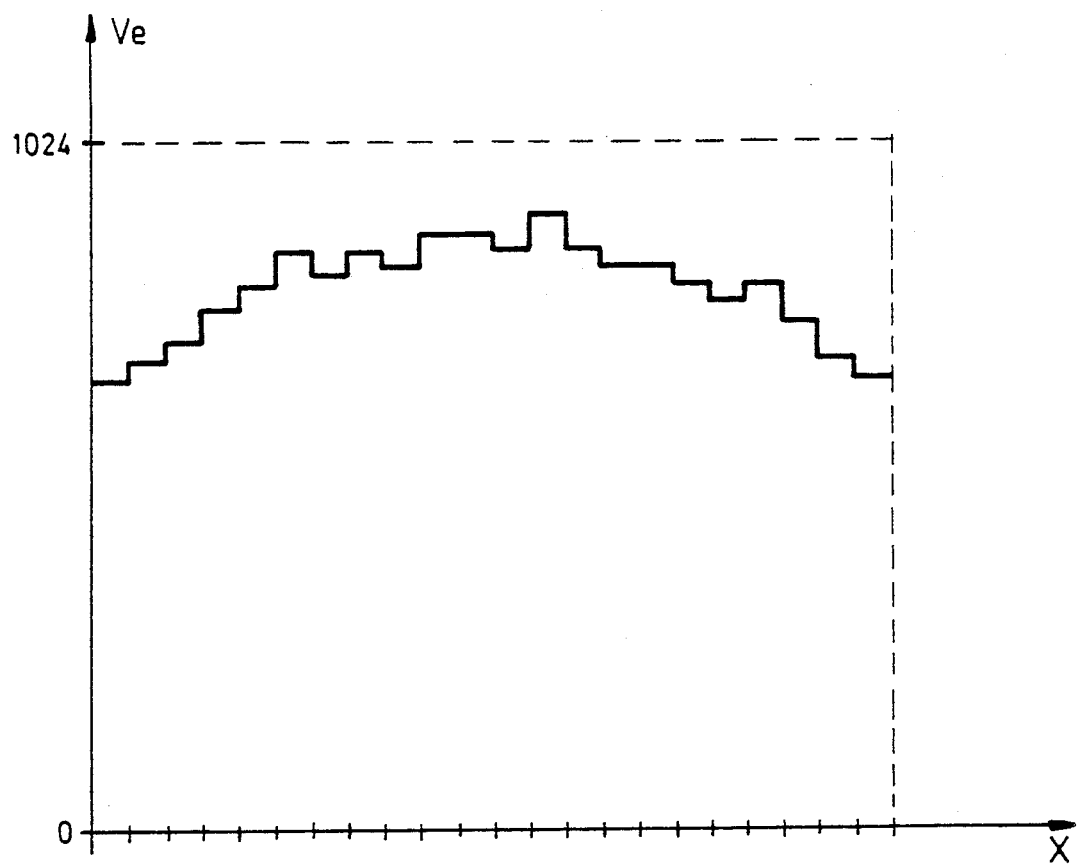
FIGS. 2 and 3 illustrate the working of a matrix infrared sensor.

FIG. 2 shows the graph of the values of the video signal Ve given by a line of the matrix of cells constituting the sensor, as a function of the abscissa x of each cell in this line. In this example, the scale of the digital values extends from 0 to 1024, and the image represents a uniform background. The graph has the shape of a dome constituted by discrete levels, because of the quantification of the values of the video signal, and it includes certain irregularities.

Figure 3:
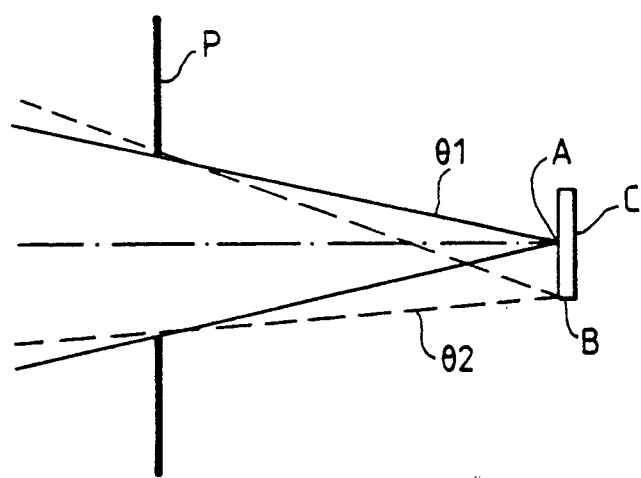

The dome shape is due to the structure effect, which is illustrated by FIG. 3. A sensor C is provided with an optical device (not shown) which has an input pupil P demarcating the angle of view of each cell of the sensor C. A cell A located at the center of the sensor C, has an angle of view $\theta 1$ which is greater than the angle of view $\theta 2$ of any cell B located at the periphery of the sensor C. The consequence of this difference in the angles of view is that the cells close to the center receive more infra-red rays coming from the scene and fewer infra-red rays coming from the structures surrounding the sensor. On the contrary, the cells located at the periphery receive fewer rays coming from the scene and more rays coming from the structures. In practice, the rays coming from the structures are appreciably less important than the rays coming from the scene. This explains the fact that the video signal given by the cells close to the center has an amplitude greater than that given by the cells of the periphery.

The irregularities that are added to the dome effect are due to the non-uniformity of the sensitivities of the cells. When the temperature Tf of the image background changes, the entire graph gets shifted vertically without distortion, generally speaking. This is also the case when the temperature Ts of the neighboring structures changes. The variations of the video signal due to the change in the temperature Ts are small as compared with the variations due to the change in the temperature Tf, for the term of the equation (1) corresponding to the temperature Tf is greater than the term corresponding to the temperature Ts. If the sensor is provided with an optical device with a small aperture, smaller than f/3 where f is the focal distance, it is possible to totally overlook the variations of Ts. This is what is achieved in the device according to the invention.

Figure 4:
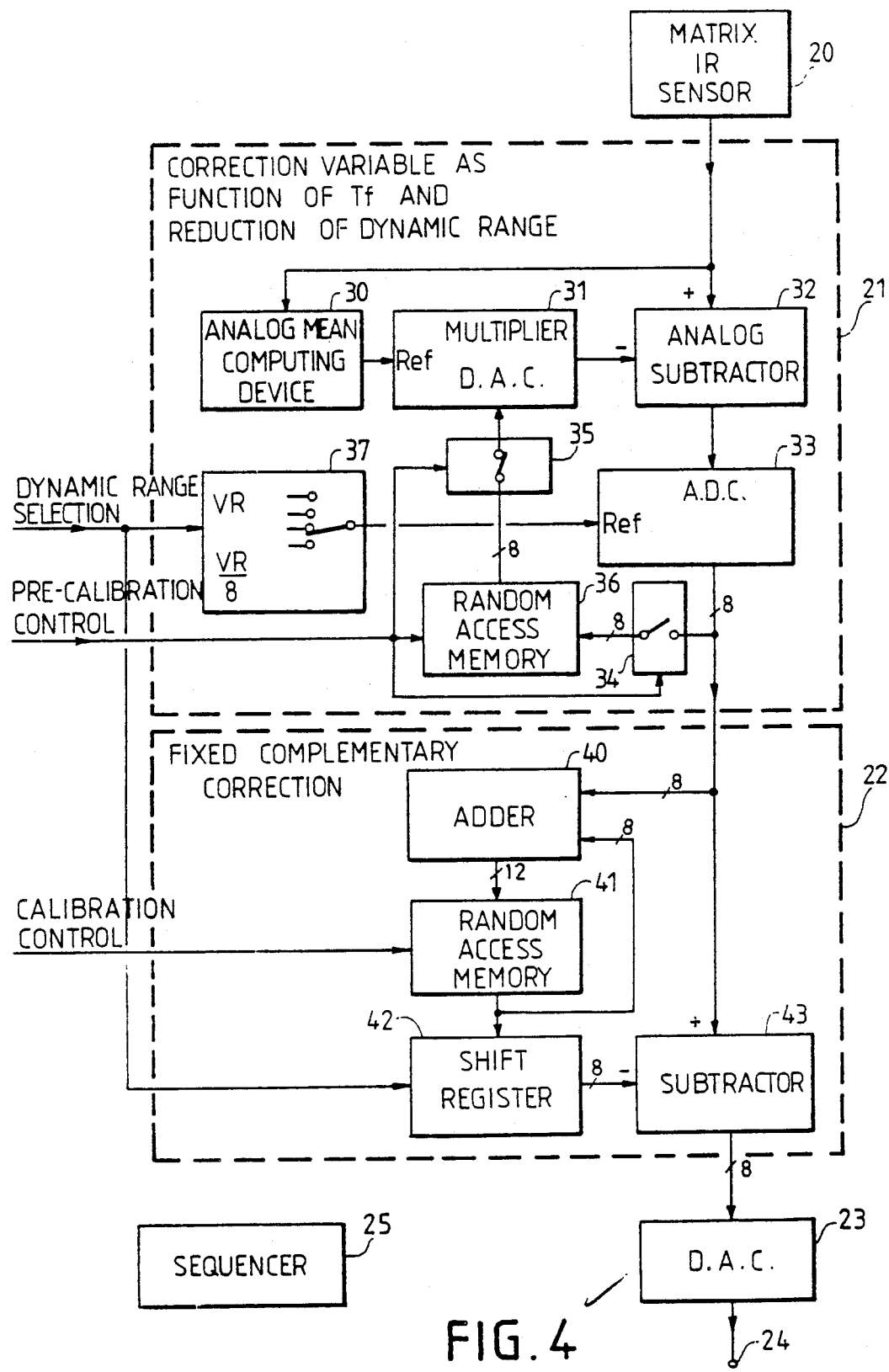
FIG. 4 shows the block diagram of an exemplary embodiment of the device according to the invention.

FIG. 4 shows the block diagram of a first exemplary embodiment of the device according to the invention. It has first correction means 21 which determine a first correction signal that is variable as a function of the temperature Tf of the background of the images, in overlooking the variations of the temperature of the structures, in such a way that the graph of this correction signal is as close as possible to the graph of the video signal, and changes in the same direction as a function of the temperature Tf.

The first correction means 21 include: means to make an approximate determination of a signal proportional to the sensitivity of each cell of the sensor, for a given temperature, during a pre-calibration period, during which the images represent a uniform background; means to determine a signal proportional to the luminance of the background of the current images for this luminance is a function of the temperature Tf of the background of the current images; and means to obtain the product of these two signals and to thus obtain a correction signal that is variable as a function of the temperature of the background, and is proportional to the sensitivity of each cell. This first correction signal enables compensation, with a high approximation, for the variations of the video signal when the temperature of the image background changes from a given temperature.

To completely cancel the variations of the video signal due to the differences in sensitivity of the cells, at least for a given background temperature, the device according to the invention further includes second means 22 to determine a second correction signal, in storing the values of the first corrected video signal, provided by the means 21, during a calibration period that is subsequent to the pre-calibration period and during which the images represent a uniform background. The means 22 subtract this second correction signal from the first corrected video signal, during the period of use subsequent to the period of calibration; and thus give a second corrected video signal.

An matrix infra-red sensor 20 is connected to an input of the first means 21. An output of the means 21 is connected to an input of the second means 22. An output of the means 22 is connected to an input of a digital/analog converter (D.A.C.) 23, the output of which is connected to an output terminal 24 of the correction device. A standard sequencer 25 gives clock signals and control signals to all the elements of the device.

The means 21 include: an analog mean-computing device 30; a multiplier digital/analog converter (D.A.C.) 31; an analog/digital converter (A.D.C.) 33; an analog subtractor 32; two switch-over devices 34 and 35; a random access memory 36; and a multiplexer 37 with four inputs and one output.

The input of the means 21 is connected to an input of the mean-computing device 30 and a first input of the subtractor 32. An output of the mean-computing device 30 is connected to a reference input of the converter 31. An output of the converter 31 is connected to a second input of the subtractor 32. A data input of the converter 31 is connected to an output of the memory 36 by means of the switch-over device 35. The output of the subtractor 32 is connected to a data input of the converter 33. A reference input of the converter 33 is connected to the output of the multiplexer 37. The output of the converter 33 is connected firstly to the output of the means 21 and secondly to a data input of the memory 36 by means of the switch-over device 34.

The switch-over devices 34 and 35, as well as a writing validation input of the random access memory 36 are controlled by a calibration signal that is given by a device (not shown) which is activated by a user when he wishes to re-calibrate the means 21. The multiplexer 37 is controlled by a control signal, called a dynamic range selection control signal, which is given by a device, not shown, activated by the user to modify the contrast of the restored images.

The means 22 include a digital adder 40, a random access memory 41, a shift register 42, and a subtractor 43.

The input of the means 22 is connected to a first input of the adder 40 and a first input of the subtractor 43. An output of the adder 40 is connected to a data input of the random access memory 41. The output of the memory 41 is connected to a second input of the adder 40 and to a data input of the shift register 42. A data output of the register 42 is connected to a second input of the subtractor 43. A data output of the register 42 is connected to a second input of the subtractor 43. An output of the subtractor 43 constitutes the output of the means 22. A control input of the random access memory 41 receives a signal known as a calibration control signal, which is given by a device (not shown) activated by a user of the correction device, when he desires to re-calibrate the means 22. A control input of the shift register 42 receives the dynamic range selection signal.

The pre-calibration control signal and the calibration control signal control a fine adjustment device (not shown) shifting the objective of the camera to defocus the images, so that the analyzed images represent a uniform background. After the pre-calibration and the calibration, the fine adjustment device automatically redoes the fine adjustment on the observed scene.

During the pre-calibration stage, the random access memory 36 is validated in writing mode, the switch-over device 34 transmits the digital values given by the converter 33, and the switch-over device 35 is opened to cut off the data input of the converter 31. The output of the converter 31 then gives a zero signal to the subtractor 32. The value Ve of the video signal is then transmitted, without modification, by the analog subtractor 32. It is converted into an 8-bit binary word by the converter 33, and this 8-bit word is recorded in the random access memory 36. The sequencer 25 thus controls the recording of all the values of the video signal of an image, in the memory 36, whenever a pre-calibration control signal is given to the correction device. These values represent approximately the sensitivity of each cell for the temperature that the background had at the time of the pre-calibration.

During the using stage, the switch-over device 34 cuts off the data input of the memory 36, the switch-over device 35 connects the output of the memory 36 to the data input of the converter 31, and the memory 36 is validated in reading mode. The values stored in the memory 36 are read periodically, at the frequency of the images. The analog mean-computing device 30 determines a mean value of the video signal Ve during the period of one image. It therefore gives a signal expressing the mean luminance of the image preceding the image undergoing correction. This luminance value is a function of the temperature Tf of the background of the current images. Naturally, it is possible to consider taking the mean of a plurality of images.

The converter 31 also acts as a multiplier for it gives an analog signal, at its output, proportional to the voltage applied to its reference input. Thus it gives the subtractor 32, in analog form, a correction signal that is proportional to the mean value determined by the mean-computing device 30 and the digital value read in the memory 36.

The correction signal given by the converter 31 is subtracted from the video signal, in analog form, in the subtractor 32. The video signal is converted into digital form only after this first correction. The value of the correction signal is generally far greater than the values of the variations of the video signal Ve corresponding to the scene. Consequently, the fact of subtracting the correction signal greatly reduces the dynamic range of the video signal. It is then possible to convert the video signal into the form of 8-bit binary words instead of 10-bit binary words which would be necessary if the conversion were to take place before the correction. An analog video signal, having a value varying from 2 volts to 2.5 volts, for example, is thus converted into a corrected analog video signal varying from 0 to 0.5 volts. It is then converted into 8-bit binary words. The resolution is strictly the same as it would be if the non-corrected video signal were to be converted into 10-bit binary words, as would be the case in the prior art. This reduction, from 10 bits to 8 bits, of all the digital components of the device simplifies its making and considerably reduces the cost of the converters 31, 33 and 23.

Moreover, this exemplary embodiment enables the user, in certain cases, to improve the contrast of the restored images. The multiplexer 37 enables him to select one reference voltage from among four voltages: VR, VR/2, VR/4, VR/8. During the pre-calibration period, the user selects the greatest reference voltage, VR, for the analyzed image representing a uniform background may be marred by an excessive dome depending on the relative detector/optic geometries. Then, during the period of use, the user selects a reference voltage which is as small as the scene has details of greater contrast. When the video signal includes values exceeding the capacity of the converter 33, the user selects a reference voltage greater than VR/8.

For example, if the corrected video signal has digital values extending to 8 levels only, for a reference voltage equal to VR, a change in this reference voltage to VR/8 enables the expansion of the variations of the video signal to 64 levels in order to increase the contrast. Naturally, for other images with greater contrasts, the capacity of the converter 33 may be exceeded, and the user would then have to bring the reference voltage down to VR/4, or VR/2, or VR, to be able to observe all the values of luminance of the images. This particular embodiment of the device according to the invention therefore has the advantage of enabling an improvement in the use of the images, for a low cost.

The first corrected video signal Ve is then corrected by the means 22 which subtract from it a correction signal having fixed values that are read periodically in the memory 41 at the frequency of the images. These values are stored in the random access memory 41 during the calibration period. During this calibration period, the random access memory 41 is validated in writing mode. With the adder 40, it constitutes an accumulator enabling the adding up of 16 values of the first corrected video signal Vec, for each pixel, in order to determine a mean value for this pixel. The result of the accumulation is divided by 16, simply by abandoning the two least significant bits of the binary word representing this result. The fact of taking the mean on sixteen images eliminates the effect of the noise of the sensor on the second correction signal. It must be noted that, unlike what happens in the prior art device, it is values of the first corrected video signal that are used and not values of the video signal directly given by the sensor. The means 22 enable the correction, at least for a given background temperature, of the faults due to the approximations on the first correction signal.

During the period of use that follows the calibration period, the memory 41 is validated only in reading mode. It gives the second input of the subtractor 43 a sequence of mean values that constitutes the second correction signal. These values go via the shift register 42 which achieves a shift that is a function of the dynamic range control signal and is such that the values of the second correction signal have the same number of levels as the values of the first corrected video signal given by the converter 33.

During the calibration period, the converter 33 receives a reference voltage equal to VR/8. Consequently, the mean values stored in the memory 41 correspond to this reference voltage. During the period of use, the user selects another reference voltage to enable an accurate restoration of the images. The dynamic range selection control signal also controls the shift register 42 in such a way as to shift each binary word read in the memory 1 by one bit, two bits or three bits, depending on whether the selected reference voltage is VR/4, VR/2 or VR.

The output of the subtractor 43 gives a second corrected video signal Vs, in digital form. The converter 23 converts it into analog form.

The fact of neglecting the effect of the variations in the temperature of the structures enables a simple estimation of the sensitivity of each cell to the variations in the temperature of the image background, on the basis of the response of each cell to a given luminance. The result thereof is a simplification of the device, since it includes no means to store the values of sensitivity to the temperature of the structures. Furthermore, this manner of estimating the sensitivity makes it possible to redo a calibration of the sensitivity as often as the user wishes it. When the temperature of the background changes in a very wide range, faults may appear in the images because of the non-linearity of the responses of the cells, differences in dark currents, and other currents that are overlooked in a first approach. It is therefore an advantage to be able to redo the pre-calibration and the calibration at will.

The invention is applicable notably to the infra-red cameras of weapons systems.

What is claimed is:

1. A device for correcting the faults of a sequence of images analyzed by an integrating matrix infra-red sensor, the cells constituting the sensor having differences of sensitivity, comprising:
    a first correction means for determining a first correction signal and for subtracting the first correction signal from a video signal given by the sensor, said first correction signal being variable as a function of the temperature of the background of the images, wherein said first correction means comprises:
    means for determining a signal proportional to the mean luminance of at least one image preceding an image undergoing correction;
    means for making an approximate determination of a signal proportional to the sensitivity of each cell of the sensor, for a given temperature, during a pre-calibration period, during which analyzed images represent a uniform background; and
    means for obtaining a product of said signal proportional to the mean luminance and said signal proportional to the sensitivity of each cell, said product constituting the first correction signal;
    said device for correcting faults further comprising a second correction means for determining a second correction signal and for subtracting said second correction signal from the video signal, wherein the second correction means is placed downstream of the first correction means, and the second correction signal is determined as a function of a first corrected video signal given by said first correction means, wherein the second correction means comprises:
    means for storing values of the first corrected video signal during the course of a calibration period during which the analyzed images represent a uniform background; and
    wherein the stored values are re-read periodically to constitute the second correction signal.

2. A device according to claim 1, wherein the means to make an approximate determination of a signal proportional to the sensitivity of each cell of the sensor, for a given temperature, include means to store the values of the video signal, given by the sensor during the pre-calibration period, then to restore these values periodically.

3. A device according to claim 1, wherein the first correction means include means to increase the dynamic range of the first corrected video signal, and wherein the second correction means include means to achieve an increase, in the same ratio, of the dynamic range of the second correction signal; these means being coupled and capable of being adjusted by a user of the correction device.

4. A device according to claim 1, wherein the means for storing the values of the first corrected video signal include an adder and a random access memory constituting an accumulator to compute a mean value of the first corrected video signal, for each cell, on a predetermined number of images.

5. A device according to claim 2, wherein the means to store, during the pre-calibration period, and then restore the values of the video signal given by the sensor, include:
    a multiplier analog/digital converter;
    a digital memory;
    a digital/analog converter;

wherein the means to determine a signal proportional to the mean luminance of at least one image preceding an image undergoing correction include an analog mean-computing device; the multiplier digital/analog converter obtaining the product of a digital value given by the memory and an analog value given by the mean-computing device to give an analog value of the first correction signal;

wherein, to subtract this latter value from a value of the video signal given by the sensor, the first correction means include an analog subtractor giving an analog value of the first corrected video signal, this analog value being then converted into a digital value by the analog/digital converter of the means for storing.

6. A device according to claim 3, wherein the means to increase the dynamic range of the first corrected video signal include a device giving an adjustable reference voltage and wherein the means to increase the dynamic range of the second correction signal include a shift register to shift the digital values of the second correction signal by an adjustable number of bits.

* * * * *